(12) United States Patent
Aoki et al.

(10) Patent No.: US 9,047,389 B2
(45) Date of Patent: Jun. 2, 2015

(54) INFORMATION DISPLAY DEVICE

(75) Inventors: Kouichi Aoki, Tokyo (JP); Takuya Kawasaki, Tokyo (JP)

(73) Assignees: SONY CORPORATION, Tokyo (JP); SONY COMPUTER ENTERTAINMENT, INC., Tokyo (JP)

( * ) Notice: Subject to any disclaimer, the term of this patent is extended or adjusted under 35 U.S.C. 154(b) by 0 days.

(21) Appl. No.: 13/277,303

(22) Filed: Oct. 20, 2011

(65) Prior Publication Data

US 2012/0075295 A1 Mar. 29, 2012

Related U.S. Application Data

(63) Continuation of application No. 12/297,355, filed as application No. PCT/JP2007/050134 on Jan. 10, 2007, now abandoned.

(30) Foreign Application Priority Data

May 2, 2006 (JP) ................................. 2006-128726
Jun. 16, 2006 (JP) ................................. 2006-167594

(51) Int. Cl.
*G06T 15/00* (2011.01)
*G06F 3/048* (2013.01)
*G06F 17/30* (2006.01)

(52) U.S. Cl.
CPC ................................ *G06F 17/30905* (2013.01)

(58) Field of Classification Search
CPC ............ G06T 19/003; G06F 17/30849; G06F 3/04815
USPC .......................................................... 715/781
See application file for complete search history.

(56) References Cited

U.S. PATENT DOCUMENTS

| | | | |
|---|---|---|---|
| 5,751,283 A | | 5/1998 | Smith |
| 2002/0080182 A1 | * | 6/2002 | Negishi et al. ................. 345/781 |
| 2004/0085335 A1 | * | 5/2004 | Burlnyk et al. ................ 345/716 |
| 2004/0261038 A1 | * | 12/2004 | Ording et al. .................. 715/792 |
| 2005/0206658 A1 | | 9/2005 | Fagans |
| 2006/0101352 A1 | | 5/2006 | Kohar et al. |

(Continued)

FOREIGN PATENT DOCUMENTS

| | | | |
|---|---|---|---|
| EP | 1418561 A1 | * | 5/2004 |
| JP | 5-224861 | | 9/1993 |
| JP | 6 266330 | | 9/1994 |

(Continued)

OTHER PUBLICATIONS

Johnson, Steve, Show Me Microsoft Office PowerPoint 2003, Oct. 2, 2003.*
Microsoft Windows 95 Operating System First Step Guide, Microsoft Corp., Dai 1 Pan, Sep. 29, 1995, p. 96.

(Continued)

*Primary Examiner* — Devona Faulk
*Assistant Examiner* — Wynton S Jones
(74) *Attorney, Agent, or Firm* — Frommer Lawrence & Haug LLP; William S. Frommer; Paul A. Levy

(57) ABSTRACT

To provide an information display device for displaying at least one item of display target information in respective screen element, receiving, while catalog display takes place, an instruction operation which is made utilizing display target information shown in the screen elements displayed as a catalog, and executing a process based on the instruction operation.

15 Claims, 15 Drawing Sheets

(56) References Cited

U.S. PATENT DOCUMENTS

| | | | |
|---|---|---|---|
| 2006/0156228 A1* | 7/2006 | Gallo et al. | 715/523 |
| 2007/0202949 A1* | 8/2007 | Kawade et al. | 463/32 |

FOREIGN PATENT DOCUMENTS

| | | |
|---|---|---|
| JP | 2000 200131 | 7/2000 |
| JP | 2001 175239 | 6/2001 |
| JP | 2002 91560 | 3/2002 |
| JP | 2002-342377 | 11/2002 |
| JP | 2003271279 A | 9/2003 |
| JP | 2006-513485 | 4/2006 |

OTHER PUBLICATIONS

Office Action issued in corresponding U.S. Appl. No. 12/297,355 on Feb. 1, 2012.

Office Action issued in corresponding U.S. Appl. No. 13/277,297 on Jan. 24, 2012.

Advisory Action issued in sister U.S. Appl. No. 13/277,297 on Aug. 14, 2013.

Office Action issued in corresponding Korean application No. 10-2008-7018926 dated May 31, 2013 and the partial English translation.

Non-Final Office Action issued in sister U.S. Appl. No. 13/277,297 dated Sep. 20, 2013.

* cited by examiner

FIG.6
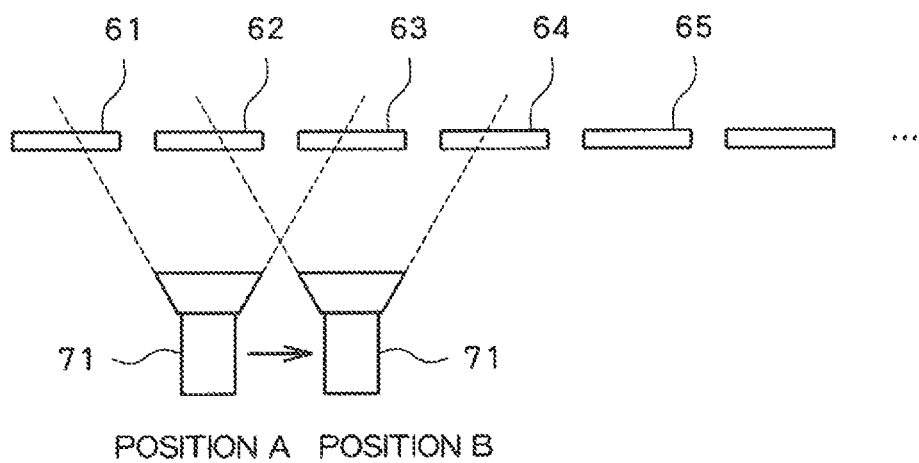
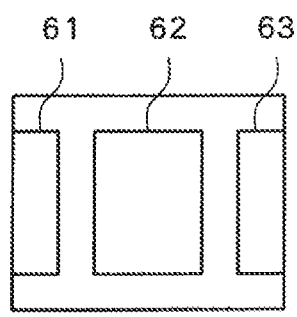
SCREEN IMAGE
VIEWED AT
POSITION A
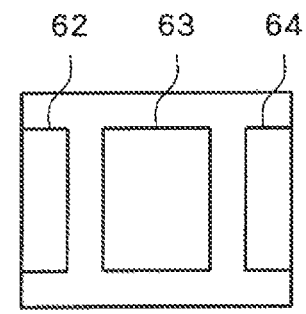
SCREEN IMAGE
VIEWED AT
POSITION B

FIG.7

| IDENTIFIER | SHAPE | ATTRIBUTE | COORDINATES |
|---|---|---|---|
| 1 | RECTANGULAR PARALLELEPIPED | WIDTH : 200  DEPTH : 1  HEIGHT : 480 | CENTER : $(x_c, y_c, z_c)$, MAIN AXIS $(x, y, z)$ |
| 2 | (CAMERA) | aaaa | bbbb |
| ... | ... | ... | ... |

FIG.8
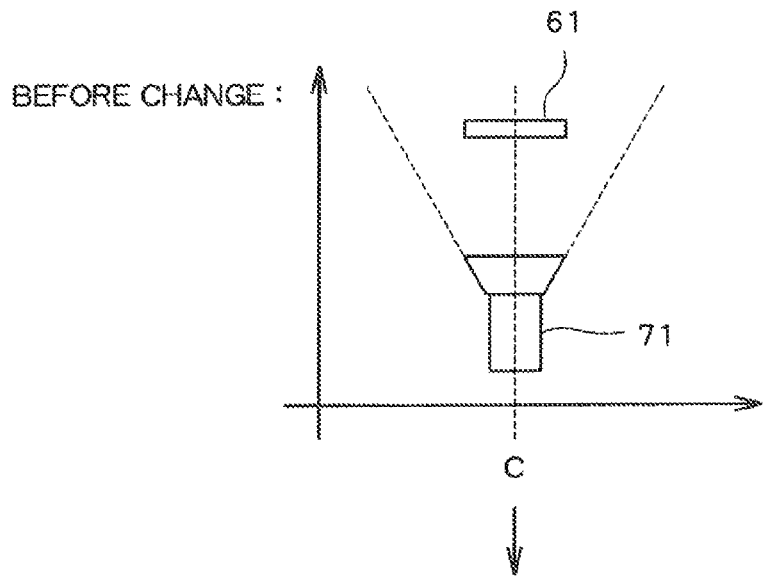
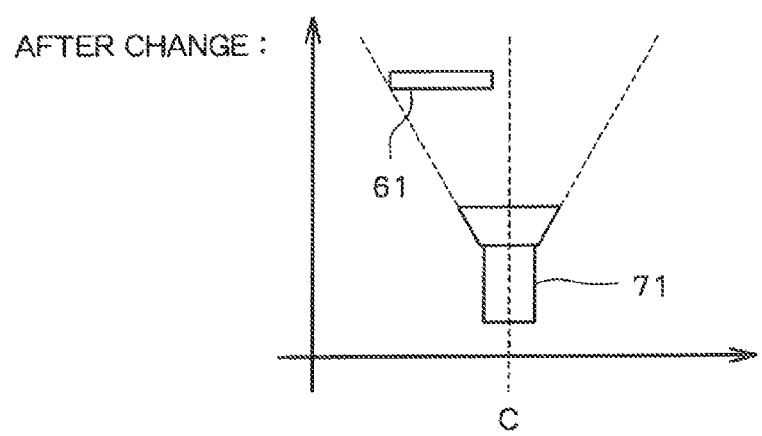
FIG.9
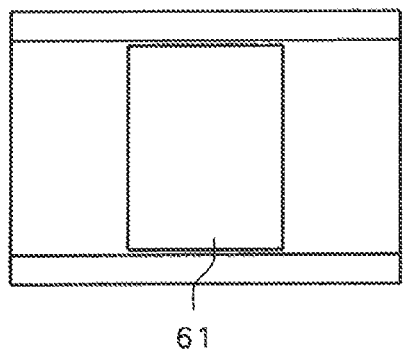
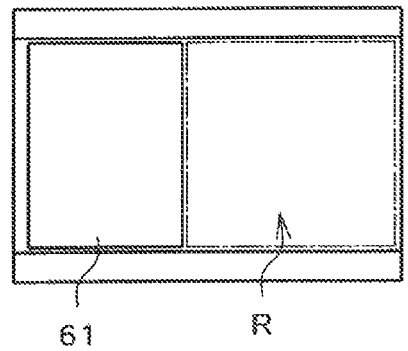

FIG.19
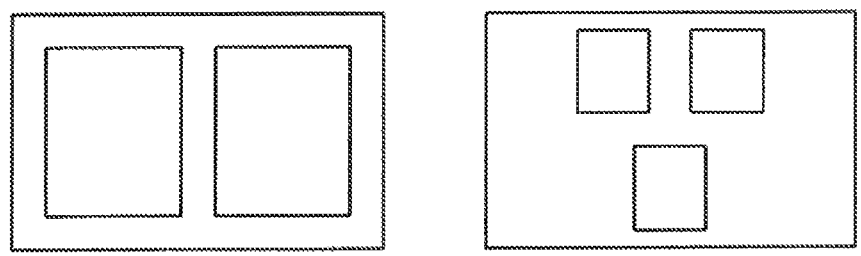
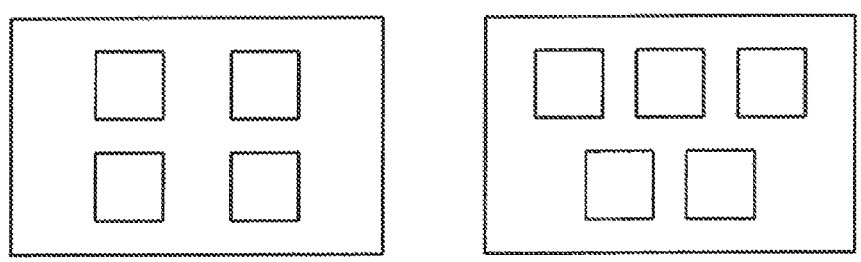
FIG.20
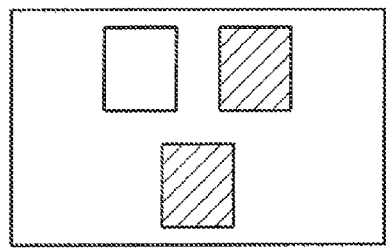
FIG.21
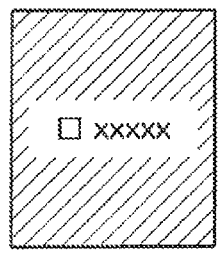
FIG.22
```
┌─────────────────────────┐
│ ≡ aaaaaa            ←───┼── A
├─────────────────────────┤
│                         │
│   ┌──┐ ─────────        │
│   │  │ ─────────   ←────┼── B
│   └──┘ ─────────        │
│        ─────────        │
│        ─────  ┌──┐      │
│        ─────  │  │      │
│               └──┘      │
├─────────────────────────┤
│ ✕  RETURN           ←───┼── C
└─────────────────────────┘
```

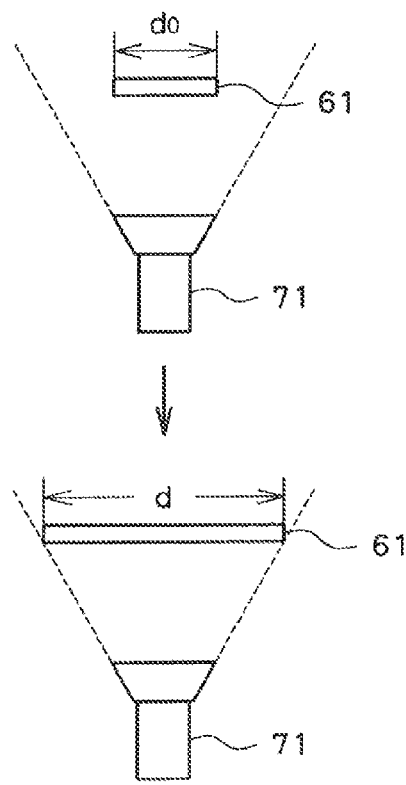
FIG.23
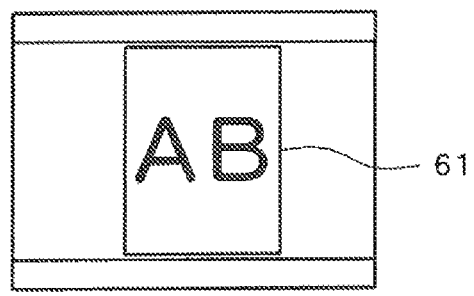
FIG.24
BEFORE CHANGE :
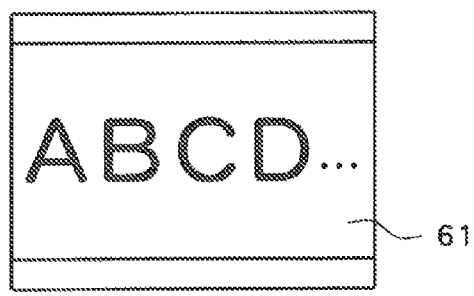
AFTER CHANGE :

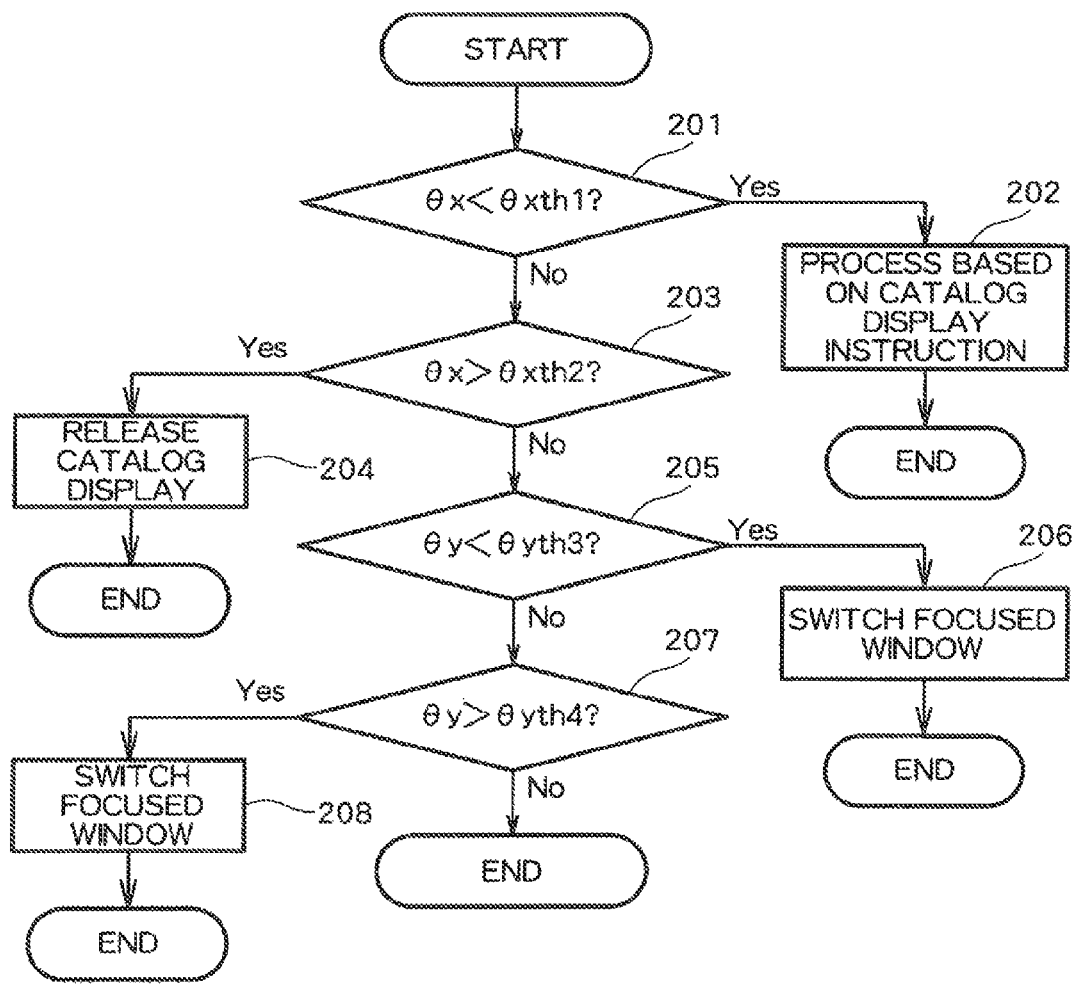

INFORMATION DISPLAY DEVICE

This is a continuation of U.S. application Ser. No. 12/297,355 filed Feb. 9, 2009 now abandoned which is a 371 of PCT/JP2007/050134 filed on Jan. 10, 2007, which claims priority to Japanese Pat. App. Nos. 2006-128726 and 2006-167594 filed in Japan on May 2, 2006 and Jun. 16, 2006, respectively, the entirety all of which being incorporated herein by reference.

TECHNICAL FIELD

The present invention relates to an information display device for displaying display target information, such as content or the like, obtained from a web server, for example, in a screen element, such as a window or the like.

BACKGROUND ART

In recent years, an information display device, such as a personal computer (PC) or the like, displays respective kinds of information in independent screen elements each referred to as a window in order to display various kinds of information on a single display screen.

For example, many web browsers or the like which produce information to be displayed (display target information) based on web page data obtained via a network from a web server or the like and display the display target information produced based on the respective web pages, each in each window.

Such an information display device for displaying information in a plurality of windows may need to show notice information asking for user confirmation of their operation or input of a password or the like in connection with display target information shown in any window.

As a specific example, in the case of a web page, HTML (Hyper Text Markup Language) data describing a web page may contain a description about a program to be processed (a script) for controlling such that display of display target information is not carried out until a password is input.

BRIEF SUMMARY

Problems to be Solved by the Invention

As such a conventional information display device displays notice information as well in an independent window, when it becomes necessary to display notice information while information items about a plurality of web pages are displayed in the respective windows, the user may not readily know that the notice information to be displayed appears in association with a web page in which window.

The present invention has been conceived in view of the above, and one object thereof is to provide an information display device for explicitly exhibiting the relationship between display target information shown in a screen element and notice information to be notified to the user.

Means for Solving the Problems

In order to address a shortcoming of the above described related art, according to the present invention, there is provided an information display unit for displaying at least one item of display target information in a respective screen element; a catalog display unit for displaying the screen elements as a catalog; and an execution unit for receiving, while catalog display takes place, an instruction operation which is made utilizing display target information shown in the screen elements displayed as a catalog, and for executing a process based on the instruction operation.

BRIEF DESCRIPTION OF DRAWINGS

FIG. 6 is a diagram explaining an example of setting of a virtual space and an example of a corresponding display screen image when changing a focused window according to the embodiment of the present invention;

FIG. 7 is a diagram explaining an example of content of an object database describing an example of setting of a virtual space in the information display device according to the embodiment of the present invention;

FIG. 8 is a diagram explaining an example of a method for forming an area for displaying a menu screen and/or notice information in the information display device according to the embodiment of the present invention;

FIG. 9 is a diagram explaining an example of a screen image with an area ensured for displaying a menu screen and/or notice information in the information display device according to the embodiment of the present invention;

FIG. 19 is a diagram explaining various examples of catalog display shown in the information display device according to the embodiment of the present invention;

FIG. 20 is a diagram explaining an example of a focused window shown in performing catalog display in the information display device according to the embodiment of the present invention;

FIG. 21 is a diagram explaining an example of a window other than the focused window, shown in performing catalog display in the information display device according to the embodiment of the present invention;

FIG. 22 is a diagram explaining an example of a screen image shown in the information display device according to the embodiment of the present invention;

FIG. 23 is a diagram explaining a window shown enlarged in the information display device according to the embodiment of the present invention;

FIG. 24 is a diagram explaining an example of a screen image with a window shown enlarged in the information display device according to the embodiment of the present invention;

FIG. 28 is a flowchart related to an example of a process based on an operation to incline the controller connected to the information display device according to the embodiment of the present invention.

DETAILED DESCRIPTION

Structure of Information Display Device

Figure 1:
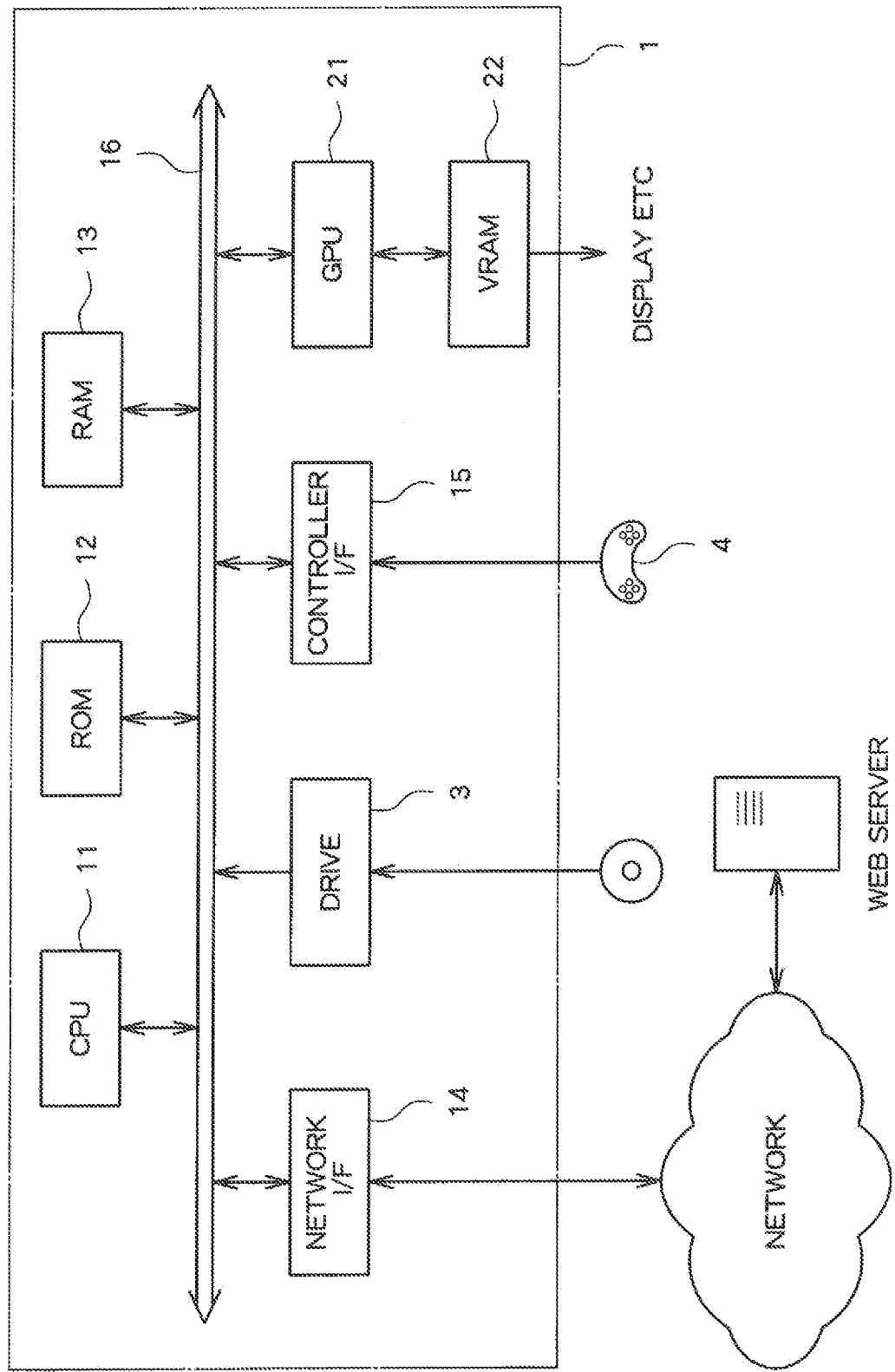
FIG. 1 is a block diagram showing an example of a structure of an information display device according to an embodiment of the present invention.

FIG. 1 is a block diagram showing an example of a structure of an information display device 1 according to an embodiment of the present invention. The information display device 1 comprises a CPU (Central Processing Unit) 11, a ROM (Read Only Memory) 12, a RAM (Random Access Memory) 13, a network I/F 14, a controller I/F 15, a GPU (Graphics Processing Unit) 21, a VRAM (Video Random Access Memory) 22, and a drive 3. The CPU 11, the ROM 12, the RAM 13, the network I/F 14, the controller I/F 15, the GPU 21, and the drive 3 are mutually connected via a bus 16. The VRAM 22 is connected to the GPU 21, and the controller I/F 15 is connected to a controller 4.

The CPU 11 operates according to a program read from a ROM 12 or a recording medium set in the drive 3 into the RAM 13. The CPU 11 is responsible for overall control of the information display device 1 in this embodiment, and carries out a process to display a plurality of kinds of display target information in respective windows, or screen elements, and a process to display notice information to be displayed in connection with display target information. The CPU 11 carries out a process to display windows in the form of a catalog (catalog display). These processes carried out by the CPU 11 will be specifically described later in detail.

The ROM 12 stores various data and a program to be executed by the CPU 11. The RAM 13 holds a program to be executed by the CPU 11. The RAM 13 also functions as a work memory of the CPU 11.

The drive 3 reads data from a recording medium, such as a DVD-ROM, a CD-ROM, or the like, mounted therein, and outputs the read data to the CPU 11. The drive 3 may be a reader of a recording medium, such as a memory stick (trademark), an SD card (trademark), and so forth, not limited to those described above.

The controller 4 may be a controller of a home-use game machine, including, for example, a key board, a mouse, or the like, of a PC. The controller 4, connected to the bus 16 via the controller I/F 15, has a direction key, other operation key, and an analogue device or the like for outputting a signal in accordance with an inclination and/or movement amount, and outputs a signal indicative of the user's operation to the CPU 11.

The network I/F 14 controls data exchange with respect to a web server connected thereto via a network. Specifically, the network I/F 14 sends information (a data acquisition request or the like) via a network according to an instruction input from the CPU 11 and outputs information (HTML data or the like) received via the network to the CPU 11. In this embodiment, the CPU 11 receives HTML data from a web server on a network, such as the Internet or the like, via the network I/F 14.

The GPU 21 carries out a calculation necessary to display graphics. The VRAM 22 is a memory for holding content to be shown on the display and receives image data produced by the GPU 21 and written into the VRAM 22. A display control unit (not shown) produces an image signal based on the image data written into the VRAM 22 and outputs the produced image signal to a television image receiver, a display device, or the like where an image is shown based on the image signal.

In the following, a process to be carried out by the information display device 1 will be described. In the following, an example in which the information display device 1 operates as a web browser controlled by the CPU 11, the GPU 21, or the like, will be described. However, this is not an exclusive example. Any information can be displayed as long as an information display process utilizing a plurality of screen elements (for example, a window) is employed.

It should be noted that the web browser realized by the information display device 1 here is a browser with tabbed interface, or so-called "tabbrowser," and displays each web page in an independent pane (realized as a window, here), or a tab. The respective tabs are displayed and switched according to the user's operation.

The information display device 1 in this embodiment carries out an information display process using a plurality of screen elements (hereinafter referred to as a window). In the above, the information display device 1 may render an image of each window into a two dimensional rendering space. However, it is determined here that the information display device 1 disposes a panel object serving as a window in a three dimensional virtual space and render an image to be displayed in a window onto at least one surface of the panel object. For example, the information display device 1 pastes as a texture a two dimensional image expressing content to be displayed.

Figure 2:
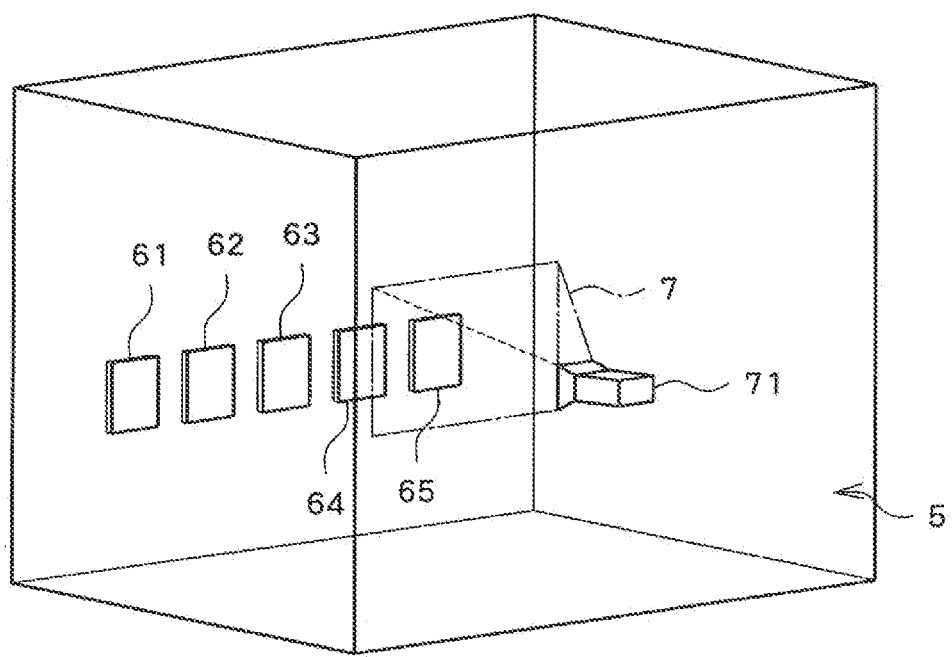
FIG. 2 is a diagram explaining an example of a virtual space realized in the information display device according to the embodiment of the present invention.

That is, data produced by the information display device 1 in this embodiment expresses a plurality of windows 61, 62, 63, 64, and 65 (panel objects), each having display target information rendered on the surface thereof, placed in the virtual space 5, as shown in FIG. 2. The information display device 1 additionally disposes a virtual camera 71 in the virtual space 5 and defines a focused area 7, or a virtual image capturing area, of the virtual camera 5. FIG. 2 shows an example in which a window 65 is located at the center of the focused area 7, or an image capturing object of the virtual camera 71, with a part of a window 64 included on the left side in the focused area 7.

Figure 3:
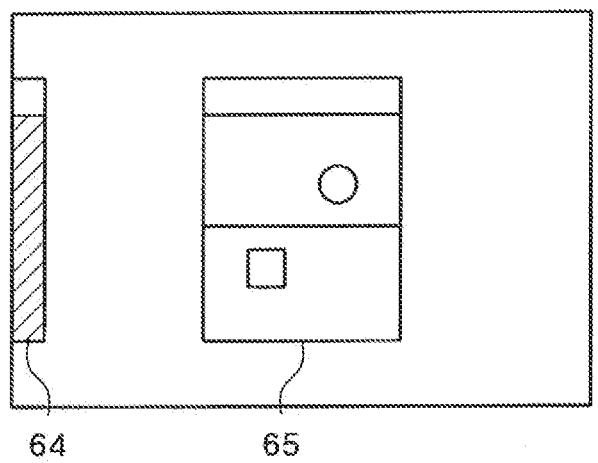
FIG. 3 is a diagram explaining an example of a screen image displayed in the information display device according to the embodiment of the present invention.

The information display device 1 renders the image of a portion contained in the focused area 7 of the virtual camera 71, based on the information about the virtual space 5. The rendered image is drawn into the VRAM 22 and displayed on an external display or the like (FIG. 3).

The virtual camera 71 can be set at any position in the virtual space 5. When the virtual camera 71 moves with the focused area 7 thereof accordingly changing, different images are resultantly rendered with accordingly different images shown on the display.

Figure 4:
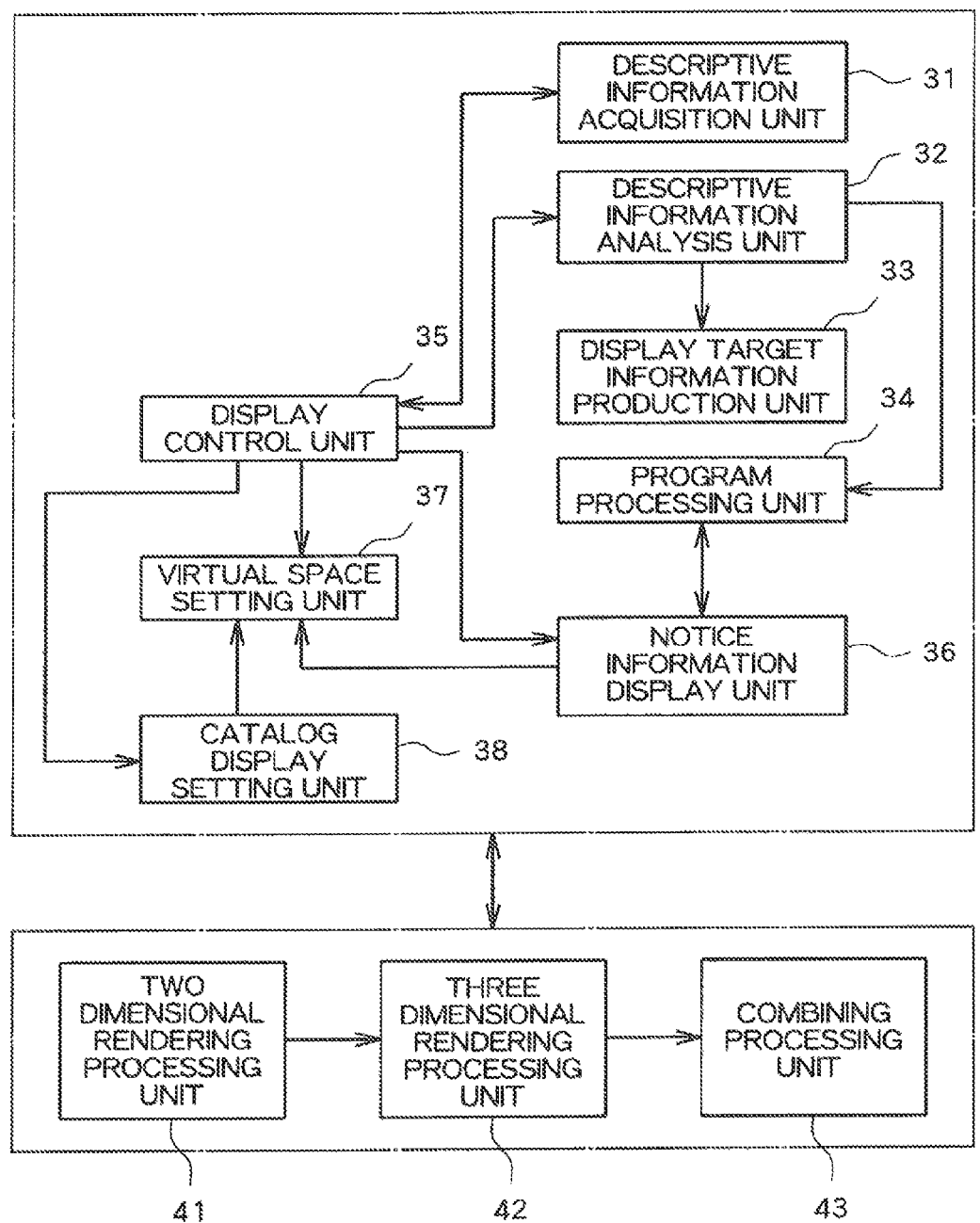
FIG. 4 is a functional block diagram related to an example of the information display device according to the embodiment of the present invention.

The information display device described as a web browser here comprises, in terms of functions, as shown in FIG. 4, a descriptive information acquisition unit 31, a descriptive information analysis unit 32, a display target information production unit 33, a program processing unit 34, a display control unit 35, a notice information display unit 36, a virtual space setting unit 37, a catalog display setting unit 38, a two dimensional rendering processing unit 41, a three dimensional rendering processing unit 42, and a combining processing unit 43.

These units are realized by the CPU 11, the GPU 21, or the like by means of software, for example, in this embodiment.

The information acquisition unit 31 receives a data acquisition request from the display control unit 35 and/or the display target information production unit 33. The data acquisition request contains a designation of such as an URL or the like. Upon receipt of the data acquisition request, the information acquisition unit 31 acquires the requested data from the designated URL or the like and outputs the acquired data to the display control unit 35 or the display target information production unit 33 having requested the data. It should be noted that data specified by an URL may be a file stored in a recording medium or the like mounted in the drive 3 of the information display device 1, not limited to data from a web server or the like on the network.

The descriptive information analysis unit 32 contains a parser (an analysis function) for HTML data, and receives from the display control unit 35, HTML data and information (an identifier of a screen element, hereinafter referred to as "a window identifier") identifying a screen element in which to display. The descriptive information analysis unit 32 then analyzes the received HTML data according to a predetermined rule. Generally, the HTML data contains a display instruction data portion instructing display of display target information and sometimes additionally contains a program data portion to be executed.

The descriptive information processing unit 32 extracts a display instruction data portion from the HTML data and outputs the extracted display instruction data portion and the window identifier to the display target information production unit 33. When a program data is additionally included in the HTML data, the descriptive information analysis unit 32 extracts the program data portion as well, and outputs to the program processing unit 34 together with the window identifier.

The display target information production unit 33 extracts information (an image data URL or the like) specifying character string information to be displayed and image data to be displayed, based on the display instruction data input from the descriptive information processing unit 32, outputs the information specifying image data to the information acquisition unit 31 with a request for acquisition of the image data specified by information, and receives image data acquired by the information acquisition unit 31 in response to the request.

Moreover, the display target information production unit 33 produces web page descriptive information in which character string information and image data are laid out, based on the display instruction data, and outputs the produced web page descriptive information to the two dimensional rendering processing unit 41 together with the window identifier.

The program processing unit 34 executes the program data input from the descriptive information processing unit 32 and holds data (a pointer indicative of the point being executed in the program and work data such as variable data and so forth) necessary in execution of the program data so as to be associated with the window identifier also input from the descriptive information processing unit 32. That is, with a plurality of windows open (that is, a plurality of web pages on display), the program processing unit 34 may execute the plurality of program data in parallel. As a method for parallel execution, a widely known process such as multithreaded process or the like is available, with detailed explanation thereof omitted here.

When any information need to be notified to the user (that is, notice information to be notified to the user in connection with any display target information) during execution of program data associated with any window identifier (hereinafter referred to as a "focused identifier" for distinction), the program processing unit 34 outputs the information to be notified to the user (hereinafter referred to as "notice information") and the focused identifier to the notice information display unit 36.

The display control unit 35 instructs the virtual space setting unit 37 to produce one window, or a screen element, at the time of activation, then receives information (window identifier) identifying the produced window from the virtual space setting unit 37, and holds the received information.

With a window produced at the time of activation, the display control unit 35 instructs the information acquisition unit 31 to acquire data specified by the URL set in advance. The data specified by the URL is determined here as HTML data. The display control unit 35 outputs the window identifier received from the virtual space setting unit 37 and the HTML data acquired by the information acquisition unit 31 to the descriptive information processing unit 32.

The display control unit 35 controls the three dimensional rendering processing unit 42 to render a three dimensional image based on a virtual space set by the virtual space setting unit 37.

The display control unit 35 controls the respective units according to the user's instruction. In this embodiment, the user makes the following instructions:

(1) an instruction (hereinafter referred to as a "new window instruction") to produce a new window (which may be a tab for displaying another web page in a web browser); (2) an instruction (hereinafter referred to as a "catalog display instruction") to display a plurality of windows in the form of a catalog; (3) an instruction (hereinafter referred to as a "focus instruction") to designate one of the plurality of windows as an object to be displayed or operated; (4) an instruction (hereinafter referred to as a "content operation instruction") to input a character string or the like into an input column shown in the selected window or to click a link shown in the selected window; (5) an instruction to close the window; and (6) an instruction (hereinafter referred to as an "end instruction") to terminate the process carried out as a browser.

These instructions are made using the controller 4, for example. In the following, a tab switching operation (an operation to switch a window positioned directly opposed to the virtual camera 71) will be described as one example operation. The tab switching operation is carried out by pressing the direction key formed on the controller 4. Specifically, where the direction keys are provided in four directions, namely, in the up, down, left, and right directions, the virtual camera 71 is moved to a position directly opposed to a window on the right side relative to the sight line direction of the virtual camera 71 when the right-side direction key is pressed. Similarly, when the left-side direction key is pressed, the virtual camera 71 is moved to a position directly opposed to a window on the left side relative to the sight line direction thereof. This is similarly applied when the respective keys formed in the vertical directions are pressed.

Further, clicking an object (a button, a character string input column, or the like) shown in a window (or a tab) will be described as another example operation. Specifically, an object click operation includes moving a pointer to a click position, and clicking, and is carried out as follows, for example. That is, moving the pointer (a mouse, cursor) to designate a click position is carried out by inclining an analogue stick or the like provided in the controller 4 or the like, and pressing a key provided separately from the direction key may be defined as a click operation.

When (1) a new window instruction among the user operations described above is made, the display control unit 35 instructs the virtual space setting unit 37 to produce one window, or a screen element, then receives information (a window identifier) identifying the produced window from the virtual space setting unit 37, and holds the information.

The display control unit 35 instructs the information acquisition unit 31 to acquire data specified by the URL set in advance. The data specified by the URL is determined here as HTML data. The display control unit 35 outputs the window identifier received from the virtual space setting unit 37 and the HTML data acquired by the information acquisition unit 31 to the descriptive information processing unit 32.

When (2) a catalog display instruction is made, the display control unit 35 instructs the catalog display setting unit 38 to display a window catalog.

Figure 5:
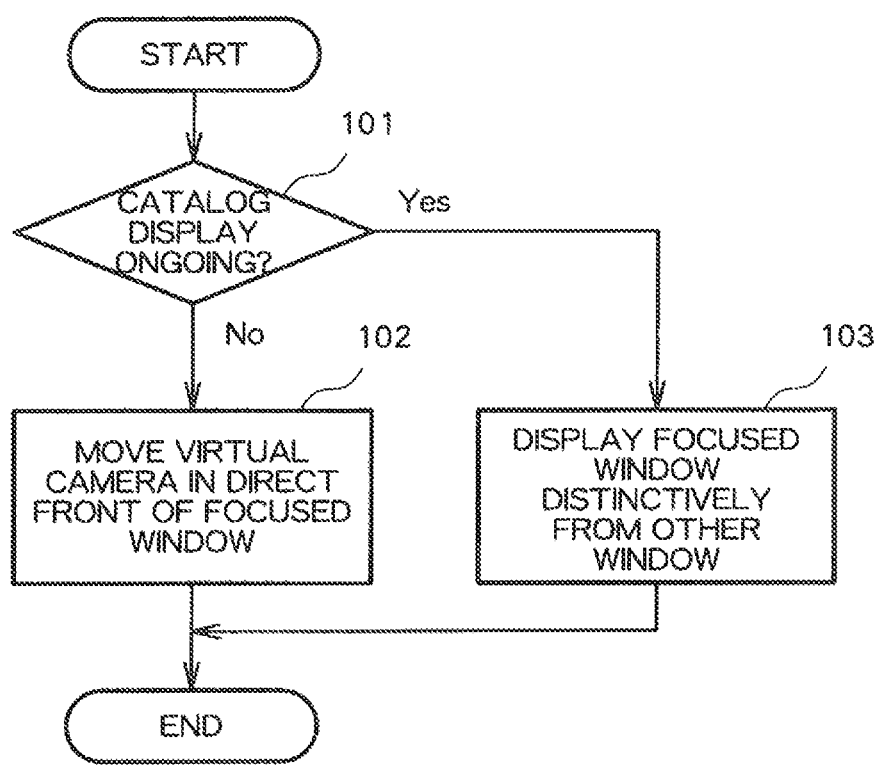
FIG. 5 is a flowchart related to an example of a process to display a focused window in the information display device according to the embodiment of the present invention.

When (3) a focus instruction is made, the display control unit 35 begins the process shown in FIG. 5. In the following, a window selected in response to the instruction is referred to as a focused window. Initially, the display control unit 35 determines whether or not catalog display takes place (101). When it is determined that catalog display does not take place, the display control unit 35 moves the virtual camera 71 to a position directly opposed to the focused window (102) before ending the process. According to the process 102, when an instruction is made to designate the window 63 as a focused window (or an instruction to move to a window at the right, which is made by the user by clicking the window 63 at the right or pressing the right-side direction key on the controller 4 or the like) while the window 62 is shown (that is, the virtual camera 71 is located in the position A in FIG. 6), the virtual camera 71 is moved to a position directly opposed to the window 63 (the position B in FIG. 6), so that the window 63, or the new focused window, is located at the center of the focused area 7 of the virtual camera 71.

Meanwhile, it is determined in the process 101 that catalog display takes place, the display control unit 35 instructs the virtual space setting unit 37 to render the images of the focused window and other window in mutually distinctive manners (103) before ending the process. The mutually distinctive manner may include, for example, superimposition of a gray image in a semi-transparent manner onto the image shown in the window. A specific example of the process 103 will be described later as well as a catalog display process.

When (4) a content operation instruction is received, the display control unit 35 updates the content shown in the focused window or the like according to the content of the operation. For example, in response to an operation to input a character string into an input column shown in the focused window selected by the user, the input letter is displayed in the input column. Also, in response to a link, a button, or the like being clicked, a process is carried out with reference to the HTML data associated with the clicked link or button. This process is identical to a process carried out as a typical browser, with a detailed description thereof omitted here.

With a link or the like clicked, the display control unit 35 outputs an instruction to acquire data from the URL associated with the clicked link or the like to the information acquisition unit 31 together with the window identifier of the focused window.

When (5) an instruction to close the window is received, the display control unit 35 controls so as not to display the window any longer which is specified as a focused window by the window identifier (an ending window) at that time. For this control, for example, the virtual space setting unit 37 may be instructed to eliminate the panel object of the ending window from the virtual space 5.

When (6) an ending instruction is received, the display control unit 35 produces notice information to confirm the end of the process and outputs to the notice information display unit 36.

The notice information display unit 36 receives, from the program processing unit 34, the window identifier (the above-described focused identifier) of the window showing the display target information associated with the program data in execution and the notice information, and defines, as a focused window, the window specified by the focused identifier (for example, a screen element (or a window) showing the display target information associated with the notice information). Then, the notice information display unit 36 displays the focused window in a distinctive manner from another window, and also displays the notice information. This display manner will be described later in detail.

The notice information display unit 36 may receive an instruction to display notice information not related to any display target information (that is, having nothing to do with any window) from the display control unit 35 or the like. In this case, the notice information display unit 36 displays the notice information in a manner different from notice information related to display target information (that is, notice information related to any window). This display manner will be described later in detail.

According to an instruction input from the display control unit 35 or the like, the virtual space setting unit 37 adds or deletes a panel object serving as a window with respect to the virtual space. Specifically, the virtual space setting unit 37 manages the virtual space 5, using an object database, such as is shown in FIG. 7.

The object database holds, for every virtual object to be contained in the virtual space 5, a unique identifier, the shape and attribute of the object, and the coordinates indicative of the position and posture of the object, all in the manner of being associated with one another. The shape or the like of a virtual object may be determined, for example, in the case of a panel object, as a rectangular parallelepiped which can be defined by the attributes including the width, depth, and height thereof. A virtual camera can be defined by information identifying a virtual camera and attributes thereof, including a sight line direction, a viewing angle, or the like (which define a focused area). The position coordinates can be determined, for every shape, so as to include the central position coordinates, and coordinates, such as the main axial direction, which indicate the posture, for example.

When the virtual space setting unit 37 newly adds a panel object, a unique identifier is newly produced (the identifier is usable as a window identifier), and a rectangular parallelepiped shape is added to the object database, such as is shown in FIG. 7. The virtual space setting unit 37 sets a shape having been determined in advance as the shape of a panel object serving as a window, in association with the information describing the newly added shape, then defines the position coordinates or the like of the panel-like rectangular parallelepiped in the virtual space, and records the position coordinates in the object database.

According to an instruction input from the display control unit 35 or the like, the virtual space setting unit 37 changes the relative positions of the virtual camera 71 and the panel object. The change in the relative positions may be carried out as $$\vec{S} + \frac{(\vec{D} - \vec{S})t}{T} \quad \text{[Expression 1]}$$

with respect to time t (t=0 to T) between the vector S indicative of the coordinates of the initial position before the change and the vector D indicative of those of a target position after the change such that the position changes as time passes, like an animation.

When the display control unit 35 needs to display a menu screen besides a window as so instructed by the user's operation, the virtual space setting unit 37 can change the relative positions of the panel object and the virtual camera 71 in the virtual space 5 such that an area for showing a menu screen is ensured on the display screen. A menu screen is a screen image or the like for use in instructing to open a new window or an URL, to close a window, and so forth. Suppose here that the window 61 is displayed at the center of the focused area 7 of the virtual camera 71 before update as shown in FIG. 8 (see the upper drawing in FIG. 8). In this case, the display control unit 35 responsive to an instruction to display a menu screen instructs the virtual space setting unit 37 to ensure a display area for displaying a menu screen, and the virtual space setting unit 37 updates the relative positions of the window 61 and the virtual camera 71 such that the window 61 is positioned in a peripheral portion in the focused area 7 of the virtual camera 71 (see the lower drawing in FIG. 8). With the above, an area (R) for displaying a menu screen is ensured after the update, not overlapping the display area of the window 61, as shown in FIG. 9.

Figure 10:
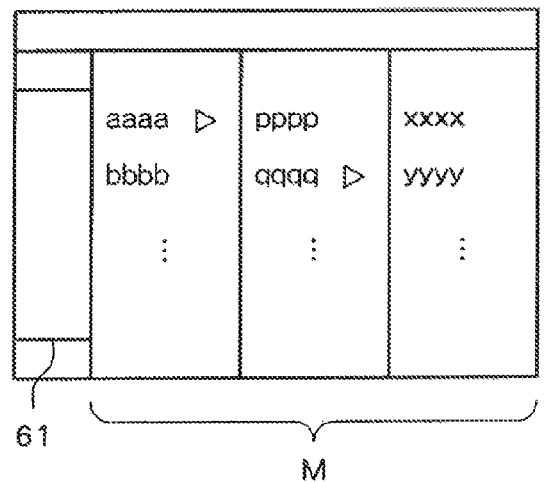
FIG. 10 is a diagram explaining an example of a menu screen image displayed in the information display device according to the embodiment of the present invention.

When the menu screen cannot be fully displayed in the area (R) (such as a menu formed in a hierarchical manner and requiring a relatively large area to display), the display control unit 35 may control such that the menu screen (M) is shown partly overlapping the window 61 shown in the peripheral portion after the update, as shown in FIG. 10. Another example of setting the virtual space 5 by the virtual space setting unit 37 will be described later.

The virtual space setting unit 37 receives, from the display control unit 35, a window identifier and an instruction to delete the panel object associated with the window specified by the window identifier. In the above, the virtual space setting unit 37 deletes the entry of the data concerning the input window identifier from the object database.

The catalog display setting unit 38 receives an instruction from the display control unit 35 to display a catalog of windows, then instructs the virtual space setting unit 37 to rearrange the plurality of windows in a predetermined manner, and changes the position of the virtual camera 71. That is, the catalog display setting unit 38 instructs to move the virtual camera 71 to a position which allows catalog display of all windows. An operation of the catalog display setting unit 38 and the virtual space setting unit 37 in response to the catalog display instruction will be described later in detail.

The two dimensional rendering processing unit 41 produces a bit map image expressing the content of a web page, based on the web page descriptive information input from the display target information production unit 33, and stores the produced bit map image in the RAM 13 in association with the window identifier input together with the web page descriptive information.

The three dimensional rendering processing unit 42 produces bit map data in which a three dimensional image is rendered, based on the setting of the virtual space 5 by the virtual space setting unit 37. Specifically, the three dimensional rendering processing unit 42 carries out the following process with reference to the object database produced by the virtual space setting unit 37. That is, the three dimensional rendering processing unit 42 renders an image obtained by projecting a panel object or the like into the field of view (the focused area 7) of the virtual camera 71. Such a rendering process can be made using many available methods, including a scan line algorithm, a ray tracing method, a radiosity method, and so forth, with detailed descriptions thereof omitted here.

In this embodiment, the three dimensional rendering processing unit 42 sets the bit map image of a web page, stored in the RAM 13 in association with the identifier (identical to the window identifier here) of each panel object, as a texture of the surface of each panel object, opposed to the virtual camera 71. With the above, each panel object functions as an image element (a window) for displaying a web page.

The combining processing unit 43 receives a character string and/or an image to be superimposed, for display, onto an image rendered by the three dimensional rendering processing unit 42, and superimposes the received character string and image onto the image rendered by the three dimensional rendering processing unit 42 to combine them (in the semi-transparent manner, for example).

One example of semi-transparent combination is a process to add the values of pixels corresponding the respective images to be combined to thereby produce a combined image.

[Display Manner of Notice Information]

In the following, a display manner for notice information in this embodiment will be described. As already described, in the web browser as an information display device in this embodiment, a notice asking for input of a password, or the user's confirmation on whether or not jump to another web page, and so forth may be shown (display of notice information) during execution of program data contained in the HTML data.

Such notice information based on HTML data is notified to the user in connection with the display target information based on the HTML data.

In this embodiment, notice information to be notified to the user in connection with any display target information, as described above, is displayed as follows. Here, which display target information the displayed notice information is connected with is determined based on the window identifier (a focused identifier) of the window showing the display target information associated with the program data in execution.

That is, the notice information display unit 36, having received a focused identifier and notice information, determines the window associated with the focused identifier as a focused window, and instructs the virtual space setting unit 37 to move the focused window from the central portion of the focused area 7 of the virtual camera 71. The virtual space setting unit 37 changes the coordinates of the focused window or the virtual camera 71 in the object database such that the focused window is located in the peripheral portion of the focused area 7 of the virtual camera 71, to thereby update the relative positions of the focused window and the virtual camera 71. This is identical to the example of the menu screen shown in FIGS. 8 and 9.

With the above, the focused window is located close to any side of the screen of the display or the like, similar to the example shown in FIG. 9, so that an area (R) for displaying the notice information is ensured. The notice information display unit 36 displays the notice information in the area (R).

Figure 11:
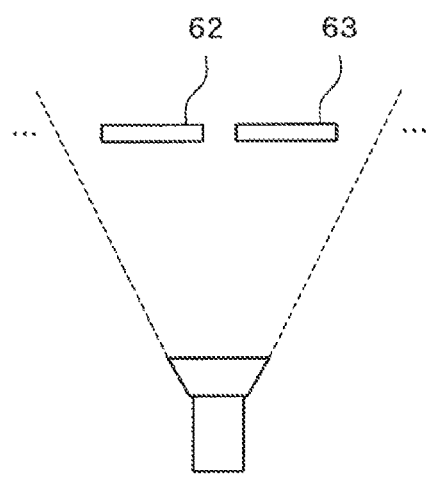
FIG. 11 is a diagram explaining an example of setting a virtual space in the information display device according to the embodiment of the present invention.
Figure 12:
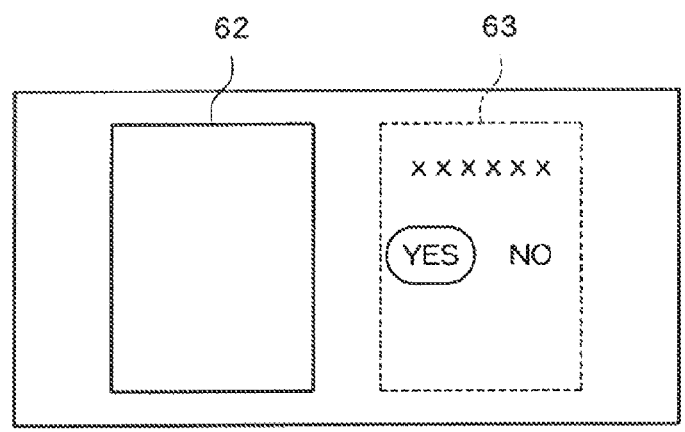
FIG. 12 is a diagram explaining an example of notice information displayed in the information display device according to the embodiment of the present invention.

Here, a case in which the windows 62, 63 and so forth are placed opposed to the virtual camera 71, as shown in FIG. 11, will be considered. In this case, when the virtual camera 71 is moved such that the window 62, or the focused window, is located in the peripheral portion of the focused area 7, the adjacent window 63 may resultantly be located in the focused area 7 of the virtual camera 71. In this case, the three dimensional rendering processing unit 42 may put a gray tone (a solid gray image) in a semitransparent manner on the texture of the display target information shown in a window other than the focused window, as a texture of the surface thereof opposed to the virtual camera 71, so that the display target information appears relatively dark (so-called dim) (FIG. 12). In this case, the display target information shown in the focused window appears relatively bright, so that the user can clearly recognize the window with which the displayed notice information is associated.

Furthermore, the notice information display unit 36 may instruct the combining processing unit 43 to display the notice information overlapping the area (R) where the adjacent window 63 is shown.

Figure 13:
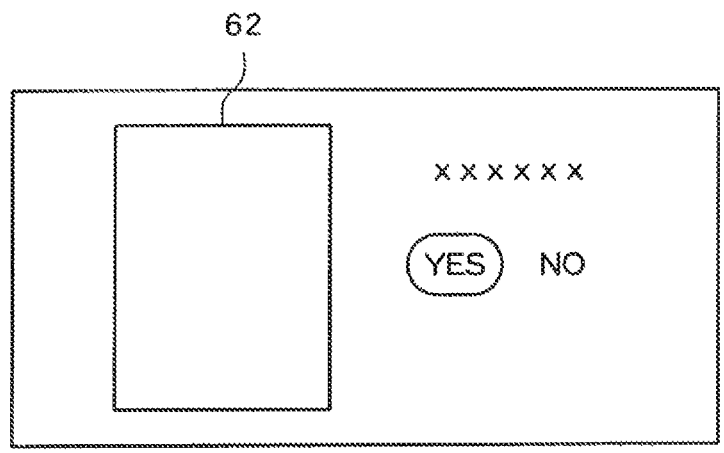
FIG. 13 is a diagram explaining another example of notice information displayed in the information display device according to the embodiment of the present invention.

Alternatively, the three dimensional rendering unit 42 may be instructed not to render the image of a window other than the focused window. In this case, the screen element other than the focused window is concealed (FIG. 13), and only the focused window and the notice information are thus displayed. This facilitates recognition of the focused window. It should be noted that a distinctive manner of display may be attained using various other methods, such as showing the frame of the focused window in a different color, blinking the focused window, and so forth, not limited to those described above.

As described above, in this embodiment, in displaying notice information, the focused window associated with that notice information is displayed in a distinctive manner from other windows. Therefore, even when a plurality of windows are shown, the displayed notice information is displayed in association with which window can be clearly recognized by viewing.

Moreover, as notice information is displayed adjacent to, but not overlapping, the focused window, the notice information and the display target information shown in the focused window can both be recognized.

It should be noted that in this embodiment control is carried out such that the displayed content of the notice information is not moved through the user's operation by employing an arrangement, for example, in which the notice information is displayed overlapping the image rendered by the three dimensional rendering unit 42 and so forth.

The notice information display unit 36 receives the user's operation relative to the notice information, and outputs the content of a response operation to the program processing unit 34. For example, when a character string "Accept cookies?" is shown together with the buttons "yes" and "no" serving as notice information, and either button is clicked, information identifying the clicked button is output to the program processing unit 34.

The program processing unit 34 receives information based on the notice information and continues the program data processing.

[Program Data Execution Control]

While the notice information display unit 36 displays notice information, the program processing unit 34 may continue execution of program data associated with other window. In the above, when the need of display of notice information arise due to the program data being executed in association with the other window, the window identifier of that window and the notice information to be displayed are stored so as to be associated with each other in a storage area of a waiting queue for notice information, set up in the RAM 13.

Then, with the ongoing notice information display completed, display of the notice information in the waiting queue begins, beginning with the information contained at the head of the waiting queue.

It should be noted that, in JavaScript or the like, for example, a request for notice information display can be made using a plurality of methods, such as alert, document (document.open), and so forth. Then, in storing into a waiting queue, the program processing unit 34 may determine a priority order (the order of time of generation in the case of the same priority) depending on the method used in requesting the notice information display, and register in the priority order in the queue.

Further, the notice information display unit 36 may instruct the program processing unit 34 to suspend processing of program data while notice information is displayed. The program processing unit 34, having received the instruction, suspends execution of the program data associated with each window on display.

In this case, the notice information display unit 36 instructs the program processing unit 34 to resume processing of the program data when display of notice information is completed, for example, by the user responding to the notice information or the like.

The above-described arrangement can avoid a complicated process that results in cases such as, while notice information is displayed, display of notice information in association with other window becomes necessary as program data associated with the other window is continuously processed.

Figure 14:
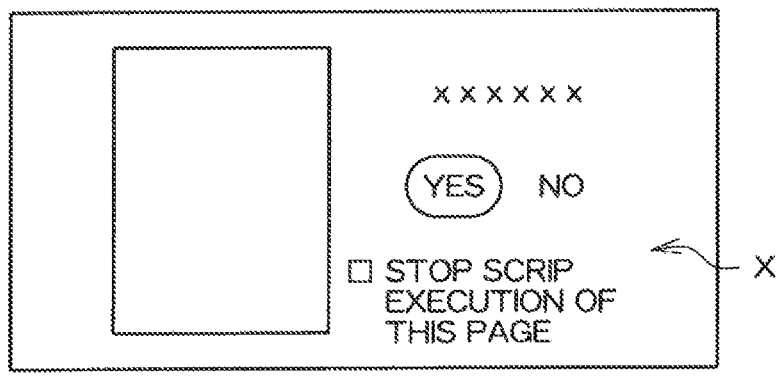
FIG. 14 is a diagram explaining another example of notice information displayed in the information display device according to the embodiment of the present invention.

The notice information display unit 36 may display a selection button X for use in instructing "suspension of program data execution of the window", together with the notice information (FIG. 14). When the user selects the selection button X to thereby respond to the notice information, the notice information display unit 36 instructs the program processing unit 34 to suspend the ongoing execution of the program data, while giving the window identifier of the focused window.

In response to the received instruction, the program processing unit 34 suspends subsequent execution of the designated program data by, for example, deleting the execution data of the program associated with the window identifier input. In this manner, the above described arrangement can address the deficiency of repetitive display of notice information due to a loop process or the like.

[Notice Information not Related to Display Target Information]

The notice information display unit 36 may receive an instruction to display notice information not related to any display target information from the display control unit 35 or the like. For example, when sufficient memory to process program data can be no longer set up, or when an exception (an error or the like) occurs while program data is processed, the program processing unit 34 or the like instructs the notice information display unit 36 to display notice information notifying to that effect.

Such notice information is regarded as notice information not related to display target information because it is associated with the entire operation, though sometimes associated with a particular window.

Moreover, connection failure to the network, production of no window due to failure in analyzing the acquired data, and confirmation as to whether or not to end the process as a browser or the like concern the whole operation as a browser, and notice information to be made in such cases is regarded as not related to display target information.

In displaying notice information not related to display target information, the notice information display unit 36 superimposes a gray tone, by means of semi-transparent manner, onto the texture of display target information set on the surface of each window, opposed to the virtual camera 71, for example, so that the display target information shown in the window is displayed relatively dark (so-called dim). Then, the notice information display unit 36 instructs the combining processing unit 43 to combine the character string of notice information or the like and the rendered image (rendered result by the three dimensional rendering unit 42) shown relatively dark in a respective window.

Figure 15:
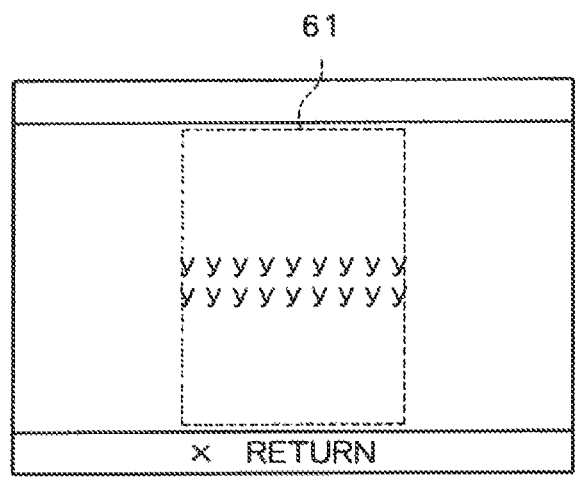
FIG. 15 is a diagram explaining still another example of notice information displayed in the information display device according to the embodiment of the present invention.

With the above, the notice information is shown so outstanding, as shown in FIG. 15, that the notice information can be readily recognized as having no relevance to the window. Alternatively, the notice information display unit 36 may instruct the three dimensional rendering unit 42 to render the image of no window, and notice information may be displayed.

As described above, an arrangement in which notice information related to display target information and notice information not related to any display target information (but related to the whole browser) are displayed in different manners can facilitate recognition by the user as to whether or not the displayed notice information is related to display target information.

[Display Manner of List Display]

In the following, a window catalog display process in this embodiment will be described. The catalog display setting unit 38 in this embodiment receives an instruction to display a window catalog from the display control unit 35 and instructs the virtual space setting unit 37 to move the virtual camera 71 to a position which enables display of a catalog covering all windows.

Figure 16:
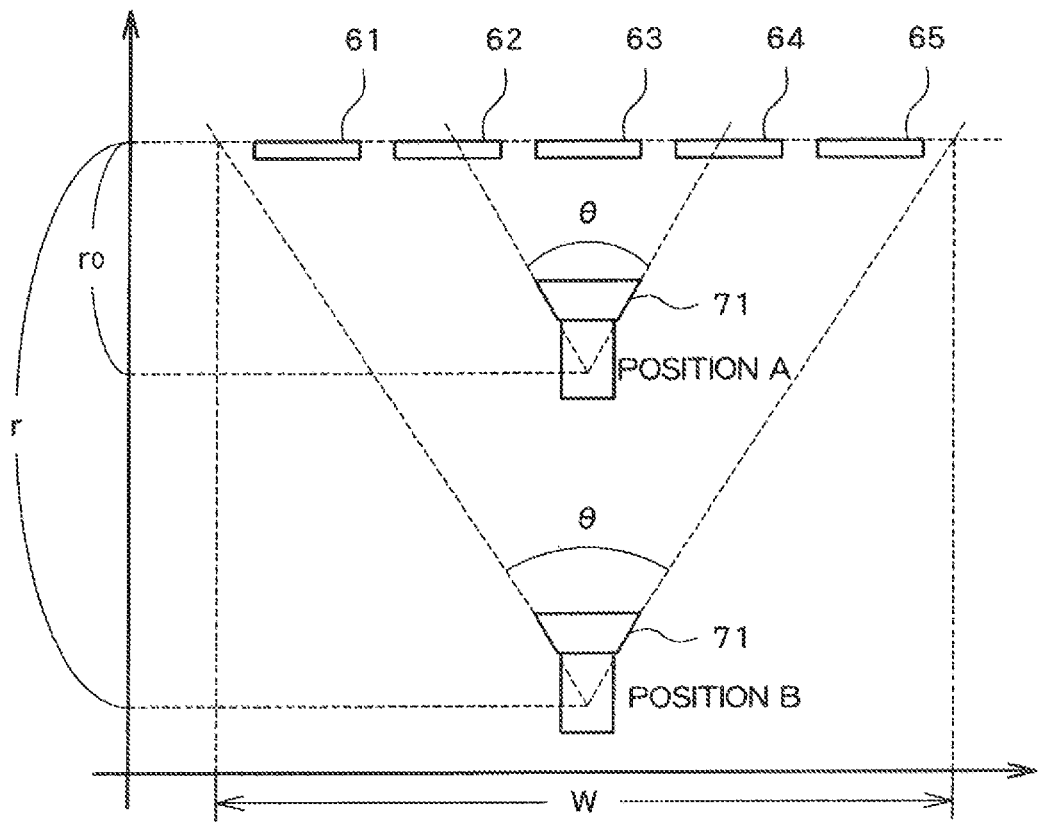
FIG. 16 is a diagram explaining an example of setting of a virtual space in performing catalog display in the information display device according to the embodiment of the present invention.

In the following, positional change of the virtual camera 71 will be described. Suppose that the respective windows are aligned on a plane, as shown in FIG. 16, when receiving an instruction to apply catalog display. In the above, the angle of the field of view of the virtual camera 71 at that time is determined as θ, and the virtual camera 71 is located at the position A in FIG. 16 (or a position away by the distance r0 from the plane with the windows aligned). In this state, one window 63 is recognized at the center with parts of other windows 62, 64 on the right and left sides thereof, respectively, as shown as an image in connection with the position A in FIG. 17.

Then, upon receipt of a catalog display instruction, the catalog display setting unit 38 instructs the virtual space setting unit 37 to change the position of the virtual camera 71. The virtual space setting unit 37 in return instructs to move the virtual camera 71 to a position farther from the plane with the windows aligned (the position away by the distance r from the plane, or the position B in FIG. 16), so that a field of view (a focused area 7) of the virtual camera 71, which is large enough to fully cover the range w larger than the area showing all windows 61 to 65 is ensured. In the above, r can be calculated as $$r = \frac{w}{2\tan\frac{\theta}{2}} \qquad \text{[Expression 2]}$$

Figure 17:
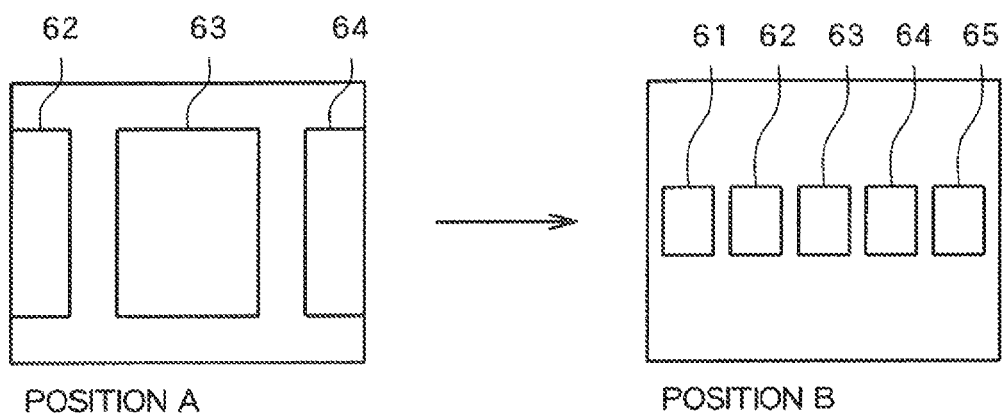
FIG. 17 is a diagram explaining an example of catalog display shown in the information display device according to the embodiment of the present invention.

With the above, all windows on display are displayed, as shown as an image in connection with the position B in FIG. 17.

Also in this case, the positions or the like of the respective objects (the panel object, the virtual camera, or the like) are moved in a stepwise manner from the initial state to the target state in which the windows are shown as a catalog, whereby the objects are displayed moving like an animation. This makes it possible for the user to know which window moves to which position. It should be noted that the position of the panel object in the initial state is separately stored in the RAM 13 as an initial position.

Further, the catalog display setting unit 38 instructs to move the virtual camera 71 farther from the panel objects corresponding to the respective windows. The catalog display setting unit 38 may instruct the virtual space setting unit 37 to rearrange the plurality of panel objects into a predetermined layout.

Figure 18:
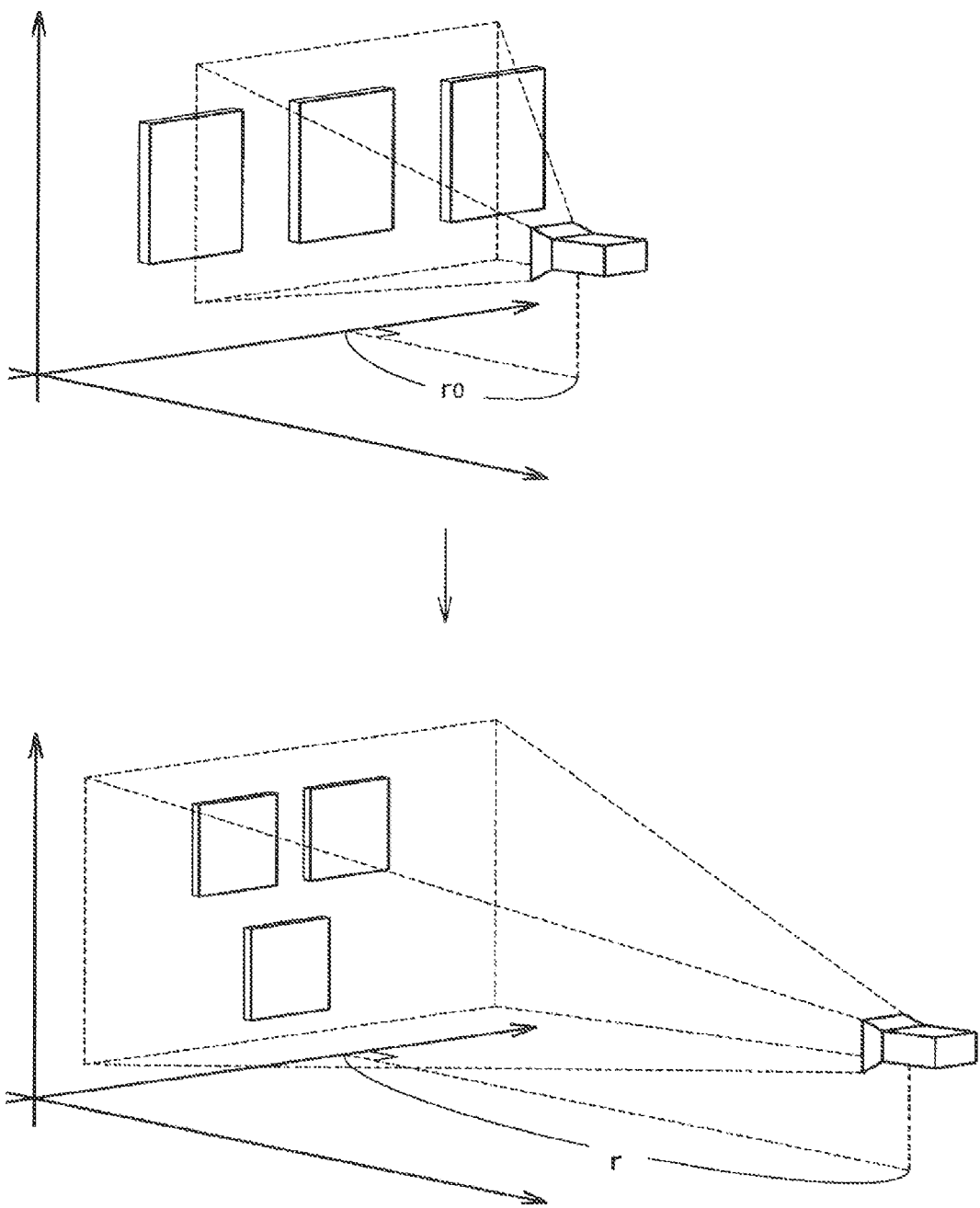
FIG. 18 is a diagram explaining another example of setting of a virtual space in performing catalog display in the information display device according to the embodiment of the present invention.

For example, with three panel objects serving as windows arranged in a horizontal line, as shown in FIG. 18, the catalog display setting unit 38 having received a catalog display instruction may rearrange the three panel objects into a triangular layout, then moves the whole of the gathered panel objects to the vicinity of a predetermined one point in the virtual space 5 (in a range within a predetermined distance from the point), and also moves the virtual camera 71 to a position remote from the plane where the panel objects serving as windows are arranged.

With the above, as the windows are gathered and shown in a relatively narrow area, each window can be displayed in a relative large size, compared to a case in which the objects are displayed in a line with the virtual camera 71 simply moved.

It should be noted that the coordinates which define the positions of the respective panel objects in catalog display may be held in advance in the RAM 13 or the like in association with the number of windows (the panel objects). The respective panel objects in a default size may be positioned so as not to overlap each other (FIG. 19). It should be noted that a different manner of disposition may be employed depending on a window size.

When the number of windows (panel objects) is changed with a window closed or newly produced while catalog display takes place, the coordinates determined relative to the new number of windows may be defined as a target position D, and the windows are displayed while moving relative to time t (t=0 to T) as $$\vec{S} + \frac{(\vec{D} - \vec{S})t}{T} \qquad \text{[Expression 1]}$$

from the initial position S before the change to the target positions D after the change, like an animation.

Further, the catalog display setting unit 38, having received an instruction to release the catalog display, instructs the virtual space setting unit 37 to move the respective panel objects to the original positions (or the positions before the catalog display) thereof, with reference to the initial positions stored in the RAM 13. The catalog display setting unit 38 also instructs the virtual space setting unit 37 to move the virtual camera 71 to a position directly opposed to the panel object corresponding to the focused window at that time to thereby return the distance to the panel object serving as a focused window to the distance before the catalog display takes place.

In response to the instruction, the virtual space setting unit 37 defines the target positions of the respective objects, and changes the positions of the respective objects according to time t, to thereby display the objects as an animation.

[Operation During List Display]

In this embodiment, catalog display is realized by simply changing the positions of the respective objects in the virtual space 5. This allows the respective windows to be operated in the same manner before and after the catalog display. Therefore, it is possible to click a link in a window or to input a character string into a character string input column in a window even while catalog display takes place.

In recent years, as it is expected that a screen capable of showing a catalog of a plurality of windows could offer improved convenience, an operating system including a technique for showing a catalog of a plurality of windows is available. However, such catalog display enables only selection of a window from the windows displayed, but not operation directly to the windows in catalog display. That is, improvement of convenience is insufficient.

On the other hand, in this embodiment, the display control unit 35 can accept an instruction operation which is made utilizing display target information shown in any of the windows in catalog display and carry out a process based on the instruction operation even while the catalog display takes place.

Further, according to the catalog display in the embodiment, the windows present in the virtual space 5 need not be all displayed. For example, when a plurality of tabs (or windows) are collectively produced through a predetermined operation, the information display device 1 issues a unique group identifier to the set of mutually related windows and holds the group identifier in association with each of the windows. Then, in response to a catalog display instruction, the catalog display setting unit 38 may display a catalog of windows having common group identifiers and, in response to a display switching operation, may display a catalog of windows having other common group identifiers.

When web pages are searched for and an operation to collectively display at least some of the web pages hit in the search in a plurality of windows (tabs), for example, is thereafter carried out, the above-described arrangement makes it possible to display the collectively displayed windows as a catalog.

Also, for example, when an instruction to open a link shown in the initially displayed window (referred to as a base window) is made, another window (referred to as a target window) is produced, and a link destination web page is be shown in the produced window (a link designation is shown in the new tab), the information display device 1 in this embodiment may assign a group identifier to the target window, which is common to the base window. In response to a catalog display instruction, the catalog display setting unit 38 may display the windows assigned with the common group identifiers in the form of a catalog. Also, in response to a display switching operation, the catalog display setting unit 38 may display the windows assigned with different common group identifiers in the form of a catalog. The above-described arrangement makes it possible to display mutually related web pages in the form of a catalog, thus offering high convenience.

The position of the virtual camera 71 (the distance from a panel object serving as a window) may be defined in advance in association with the number of windows in the virtual space 5 (the number of open tabs). The catalog display setting unit 38 checks the number of windows present in the virtual space 5 in response to a catalog display instruction and moves the virtual camera 71 to the position defined in association with that number. In this case, the number of windows which can be displayed as a catalog in the field of view of the virtual camera 71 positioned as defined according to the number of windows (the number of tabs open) in the virtual space 5 are displayed. The number of windows allowed to be displayed as a catalog, as described above, however, is not necessarily the number of all windows present in the virtual space 5.

As described above, this embodiment can achieve display of an individual window, catalog display of all windows, and catalog display of some windows, as well as animation display in shifting from one display style to another, that is, displaying in a different manner from that in screen switching. This enhances visible recognition of the relationship among windows between the respective displays.

[Selection of Window in List Display]

In this case, an instruction operation which is made utilizing display target information shown in any screen element is defined separately from an operation (a tab switching operation) to select any of the screen elements in catalog display. That is, the display control unit 35 does not switch the focused window in response to a window clicking operation at least while catalog display takes place, and instead, receives a selection instruction (a tab switching instruction) instructing to select a focused window, which is made using a different key or the like, for example. As a window selection operation is defined separately from an operation relative to display target information, as described above, the display control unit 35 can receive an instruction operation which is made utilizing display target information shown in the window in catalog and carry out a process based on the instruction operation even while catalog display takes place.

It should be noted that gray tone is superimposed in a semi-transparent manner onto the texture of display target information shown in a window other than the focused window while catalog display takes place so that the display target information is shown relatively dark (so-called dim) (FIG. 20). This facilitates visual recognition of the focused window.

Further, a title (a text designated as a title by the HTML data), bit map image (icon images referred to also as so-called favicon, a short-cut icon, a website icon, and so forth) defined by a website, and so forth may be superimposed for display onto the window on dim display other than the focused window (FIG. 21).

[Shift from List Display to Notice Information Display]

In this embodiment, the program processing unit 34 can process program data even while catalog display takes place. This may raise a need for the program processing unit 34 to display notice information. In this case, the setting of the virtual space 5 may be updated such that the catalog display shifts to the display in the state shown in FIG. 12 or 13.

[Display Example]

In this embodiment, an image to be displayed is produced by being rendered by the three dimensional rendering unit 42 and then superimposed by a character string or the like, such as notice information or the like, by the combining processing unit 43. Further, the CPU 11 superimposes a title bar (A)

containing a title (a text designated as a title by HTML data) and an icon defined by a website (so-called favicon) or the like and an operation guidance bar (C) presenting information about an available operation onto the image to be displayed, as shown as an example in FIG. 22. The resultant image may be drawn into the VRAM 22. In FIG. 22, the title bar and the operation guidance bar are shown above and below the image to be displayed, respectively, though this arrangement is not an exclusive example.

In response to the user's instruction to display a window enlarged, the information display device 1 in this embodiment specifies the window addressed by the enlarged display instruction and changes the size of the panel object corresponding to the specified window and placed in the virtual space 5.

For example, as shown in FIG. 23, the width d0 of the window 61, or a panel object, is changed to the width d (d>d0). Accordingly, a window 61 wider than the window 61 before the size change is shown on the display, as shown in FIG. 24.

According to this embodiment, display of an individual window (a tab), display of a window catalog, and display of notice information can be shifted from one to another like an animation. That is, the states of display can be changed by successively moving the virtual camera 71 and the panel objects serving as windows. With this arrangement, visible recognition as to which window is displayed in which position in the respective display states is improved.

It is described in the above that an instruction to apply catalog display of a plurality of windows (a catalog display instruction), a focus instruction to designate one of the plurality of windows as a window to be displayed or operated, and an instruction to release the catalog display and to display the focused window at the center of the screen image, and so forth, are made by operating the key or the like formed on the controller 4.

Alternatively, in the case where the controller 4 has a means, such as an acceleration sensor, a gyro sensor, or the like, for determining the posture thereof, an operation to incline the controller 4 itself may be accepted as an instruction operation or the like.

Figure 25:
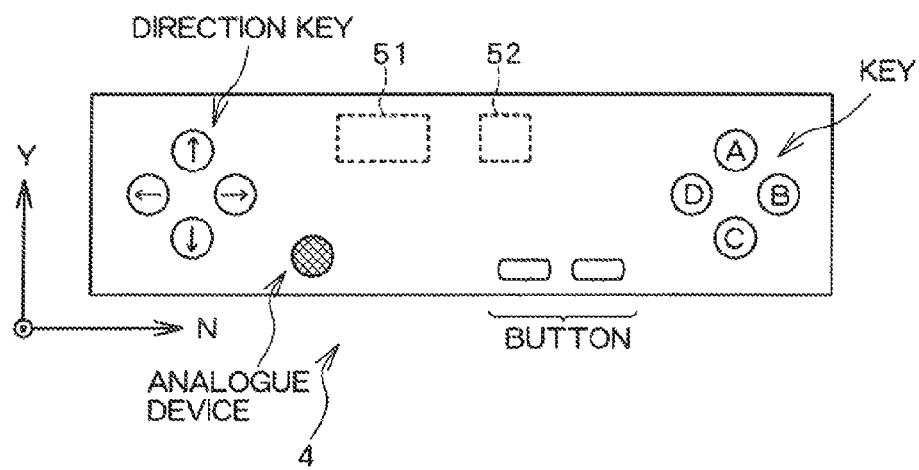
FIG. 25 is a schematic diagram showing an example of a controller connected to the information display device according to the embodiment of the present invention.

That is, such a controller 4 has direction keys, an analogue device, operation buttons, and other keys (denoted as "A" to "D" in the drawing) formed on the front surface thereof and an acceleration sensor 51 and a gyro sensor 52 incorporated therein, as shown in FIG. 25, for example. The acceleration sensor 51 incorporates an anchor, for example, supported by a beam and detects the amount of deflection of the beam due to the displacement of the anchor caused by the acceleration applied thereto to thereby determine the acceleration applied to the anchor. The acceleration sensor 51 in the embodiment may be a triaxial acceleration sensor for detecting accelerations (acceleration due to gravity) in mutually substantially orthogonal triaxial directions. As shown in FIG. 25, the acceleration sensor 51 is fixedly mounted inside the enclosure of the controller 4 with three mutually orthogonal reference axes, namely the x, y, and z axes, set therefor. Here, for example, the x axis may be defined corresponding to the longitudinal direction (the right-left direction) of the controller 4; the y axis may be defined corresponding to the depth direction (the front-back direction) of the same; and the z axis may be defined corresponding to the width direction (the direction perpendicular to the paper surface of the drawing) of the same. The acceleration sensor 51 detects accelerations in the respective three reference axes, and outputs three voltage values in accordance with the detected accelerations. Specifically, the acceleration sensor 51 outputs a voltage signal substantially proportional to the determined acceleration. That is, the acceleration sensor 51 outputs a reference voltage Vo with no acceleration detected, and acceleration is generated in which of the positive and negative directions as to each axis is determined depending on whether the output voltage value is larger or smaller than the reference voltage, Vo. The controller 4 outputs a digital value obtained by converting a voltage signal into a digital signal (A/D conversion) as information describing the inclination angle.

Figure 26:
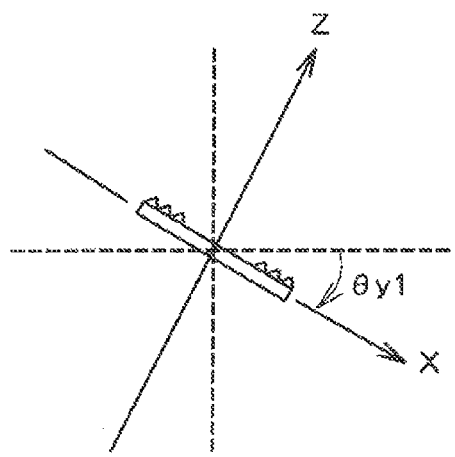
FIG. 26 is a diagram explaining an example of an operation to incline the controller connected to the information display device according to the embodiment of the present invention.
Figure 27:
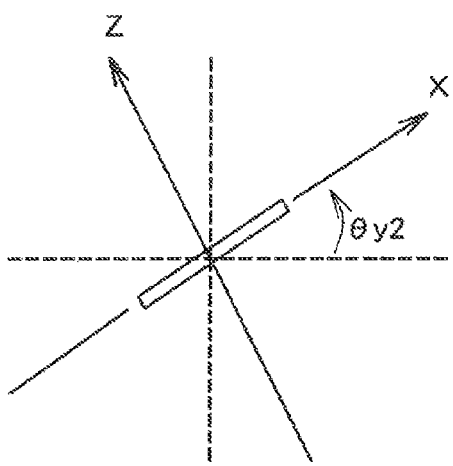
FIG. 27 is a diagram explaining another example of an operation to incline the controller connected to the information display device according to the embodiment of the present invention.

Among the outputs from the acceleration sensor 51, an output indicative of the acceleration in the x axis is changed according to inclination of the controller 4 with the y axis as a center. For example, while the controller 4 remains inclined by $\theta y1$ degrees ($\theta y1 < 0$) in the longitudinal direction relative to the horizontal surface, as shown in FIG. 26, the gravity acceleration a in the x axial direction remains $\alpha \sin \theta y1$ ($a = \alpha \sin \theta y1$). Also, while the controller 4 remains inclined by $\theta y2$ degrees ($\theta y2 > 0$) relative to the horizontal surface, as shown in FIG. 27, the gravity acceleration a in the x axial direction becomes $\alpha \sin \theta y2$ ($a = \alpha \sin \theta y2$). In the above, $\alpha$ is a negative coefficient. Therefore, information describing the angle becomes $\theta = \arcsin(a/\alpha)$, expressed using the acceleration value a expressed with the voltage value V. Similarly, the acceleration in the y axis changes according to inclination of the controller 4 with the x axis as a center.

The gyro sensor 52 determines the angular speed of the rotation of the controller 4 around the z axis, and outputs the determined angular speed. The CPU 11 samples an output from the gyro sensor 52 for every constant period of time and calculates an integration to thereby determine a displaced amount of the rotation of the controller 4 relative to the z axis.

Using the above-described controller 4, operations corresponding to

A. an instruction (a catalog display instruction) to apply catalog display of a plurality of window;

B. a focus instruction to designate one of the plurality of windows as a window to be displayed or operated; and C. an instruction to release the catalog display and to display the focused window at the center of the screen image are defined as follows, for example.

An operation to incline the controller 4 farther from the user of the controller 4 with the x axis as a center can be defined as a catalog display instruction, or A above. For a focus instruction, or B above, an operation to incline the controller 4 either leftward or rightward with the y axis as a center may be defined triggering sequential switching of a window to be displayed or operated whether for catalog display or not. An operation to incline the controller 4 toward the user of the controller 4 with the x axis as the center can be defined as an operation to release the catalog display, or C above.

It should be noted that it may be determined, in order to prevent the catalog display or focus switching from being effected in response to a subtle inclination operation, that such operations are effected only when the controller 4 is inclined by an amount exceeding a predetermined angular threshold.

For example, the CPU 11 receives information about an inclination angle of the controller 4 from the controller 4 and operates as follows. Here, assume that information about at least an inclination angle $\theta y$ in the x axial direction (the y axis serving as a rotational axis) and an inclination angle $\theta x$ in the y axial direction (the x axis serving as a rotational axis) are received.

As shown in FIG. 28, the CPU 11 checks whether or not the inclination angle $\theta x$ in the y axial direction is smaller than a predetermined first angular threshold $\theta xth1$ ($\theta xth1 < 0$) (process 201). When the inclination angle θx is smaller than the predetermined first angular threshold θxth1, it is determined that the controller 4 is inclined farther from the user of the controller 4 by an angle exceeding the predetermined angular threshold. That is, it is determined that a catalog display instruction is made, and a process based on the catalog display instruction is carried out (process 202) before completing the process.

Meanwhile, when it is determined in the process 201 that the inclination angle θx in the y axial direction is not smaller than the predetermined first angular threshold θxth1 (θxth1<0), the CPU 11 checks whether or not the inclination angle θx in the y axial direction exceeds a predetermined second angular threshold θxth2 (θxth2>0) (process 203). When the inclination angle θx exceeds the predetermined second angular threshold θxth2, it is determined that the controller 4 is inclined closer to the user of the controller 4 by an angle exceeding the predetermined angular threshold. That is, it is determined that an instruction to release the current catalog display is made. Then, the CPU 11 releases the current catalog display, if any, and moves the respective windows to their respective positions before the catalog display takes place, and moves the virtual camera 71 to a position opposed to the current focused window (the focused window) (process 204) before ending the process.

Meanwhile, when it is determined in the process 203 that the inclination angle θx does not exceed the predetermined second angular threshold θxth2, the CPU 11 checks whether or not the inclination angle θy in the X axial direction is smaller than the predetermined third angular threshold θyth3 (θyth3<0) (process 205). When it is determined that the inclination angle θy is smaller than the third angular threshold θyth3, it is determined that the controller 4 is inclined leftward by an angle exceeding the predetermined angular threshold. Then, the CPU 11 carries out a process to select (a focused tab switching process) a window as a focused window in a predetermined selection order (process 206). This process differs depending on whether or not catalog display currently takes place. Specifically, when catalog display does not take place and there is a window at the left of the current focused window in the field of view of the virtual camera 71, that window is regarded as a new focused window and the virtual camera 71 is moved to a position directly opposed to the new focused window.

Meanwhile, when it is determined in the process 206 that catalog display takes place and there is a window in the same row of, and at the left of, the current focused window, that window is regarded as a new focused window. On the other hand, when there is no window in the same row of, and at the left of, the current focused window, whether or not any window is displayed above the current focused window (that is, in the upper area in the field of view of the virtual camera 71) is determined. With any window displayed in the concerned area, the window at the right end of the row above the current focused window is selected as a new focused window. When the focused window is already the uppermost and leftmost window in the catalog, focused window switching may not be effected in response to the inclining operation.

Returning to process 205, when it is determined that the inclination angle θy in the X axial direction is not smaller the predetermined third angular threshold θyth3 (θyth3<0), the CPU 11 then determines whether or not the inclination angle θy in the X axial direction exceeds the predetermined fourth angular threshold θyth4 (θyth4>0) (process 207). When the inclination angle θy exceeds the predetermined fourth angular threshold θyth4, it is determined that the controller 4 is inclined rightward by an angle exceeding the predetermined angular threshold, and the CPU 11 carries out a process to select (a focused tab switching process) a window as a focused window in a predetermined selection order (process 208). In the above, a different process is carried out depending on whether or not catalog display takes place. Specifically, when catalog display does not take place and there is a window at the right of the current focused window in the field of view of the virtual camera 71, that window is regarded as a new focused window and the virtual camera 71 is moved to a position directly opposed to the new focused window.

Meanwhile, when it is determined in the process 208 that catalog display takes place and there is a window in the same row of, and at the right of, the current focused window, that window is regarded as a new focused window. On the other hand, when there is no window in the same row of, and at the right of, the current focused window, whether or not any window is displayed below the current focused window (that is, in the lower area in the field of view of the virtual camera 71) is determined. With any window displayed in the concerned area, the window at the left end of the row below the current focused window is selected as a new focused window. When the focused window is already the lowermost and rightmost window in the catalog, a focused window switching may not be effected in response to the inclining operation.

The above-described controller 4 facilitates a display window (tab) switching operation, utilizing an inclining operation.

It should be noted that the first to fourth angular thresholds are not necessarily identical. For example, in the case where inclining the controller 4 farther from the user of the controller 4 is not as easy as inclining closer to the user for some reason, the absolute value |θxth1| of the first angular threshold concerning inclination of the controller 4 farther from the user may be defined smaller than the absolute value |θxth2| of the second angular threshold.

The CPU 11 may wait for a predetermined period of time after the processes 206 and 208, rather than simply ending the process, and repeat the process 201 and thereafter. The waiting time may be defined in accordance with the inverse of the absolute value of a value obtained by subtracting an angular threshold (the third angular threshold θyth3 in the process 206 and the fourth angular threshold θyth4 in process 208) from the inclination angle θy (for example, the waiting time may be defined by multiplying the inverse by a predetermined constant). With the above, the focused window switching speed (or, the tab switching speed) can be controlled according to the inclination angle. Specifically, the focused window is switched relatively slowly for a smaller inclination angle and relatively fast for a large inclination angle.

Also, the virtual camera 71 may move in the virtual space 5 according to inclination of the controller 4 itself. For example, when the controller 4 is inclined rightward, the virtual camera 71 moves rightward relative to the sight line thereof. When the controller 4 is inclined closer to the user thereof, the virtual camera 71 moves upward relative to the sight line thereof. In the above, the moving speed may change depending on the magnitude of the inclination (the angle). For example, the larger the inclination angle θ becomes, the larger the amounts (that is, the moving speed) Δx, Δy by which the vertical camera 71 moves per unit time becomes.

With the downward direction key pressed, for example, the virtual camera 71 may move farther from the window to thereby enlarge the field of view thereof. With the upward direction key pressed, the virtual camera 71 may move closer to the window. According to the above-described operation method, the user may feel a sense of freedom as if floating in the virtual space 5, compared to an operation method using a cross key in moving an object in the virtual space 5, and thus can operate intuitively.

It should be noted that, although an example in which an operation is carried out according to an inclination angle of the controller 4 relative to a predetermined reference state (for example, the controller 4 in a horizontal position) is described in the above, the angle values θx0, θy0 at the time that any key (hereinafter referred to as an inclination instruction key) formed on the controller 4 is pressed may be obtained, and inclination angles may be calculated as $$\theta x = \theta xd - \theta x0$$

$$\theta y = \theta yd - \theta y0$$

using the inclination angles θxd, θyd, determined using the angular values θx0, θy0 as references.

Alternatively, an operation carried out by inclining the controller 4 may be accepted only while the inclination instruction key is kept pressed.

The inclination instruction key may be any of the keys A to D and the direction keys shown in FIG. 25, for example.

The respective keys on the controller 4 are assigned respective functions by the program executed by the information display device 1 (for example, application of click is admitted in response to the key B pressed), though the inclination instruction key may remain free from any other function.

Alternatively, the inclination instruction key may be assigned another function. For example, suppose that the key A is assigned a function for displaying a map (a map display function) showing the position of the virtual camera 71 in the virtual space 5. In the above, it may be arranged such that virtual camera 71 can move in the virtual space 5 in response to inclination of the controller 4 while the key A is kept pressed. The inclination instruction key may not always be a single key. For example, while the key A, assigned with a map display function, is used as an inclination instruction key, any other key (for example, the key C) may also be used exclusively as an inclination instruction key. Further, when there is any key formed on the side surface of the controller 4 (not only the left/right side surfaces; but also the farther and nearer side surfaces of the controller 4, relative to the user of the controller 4), that side surface key may be used as an inclination instruction key.

What is claimed is:

1. An information display method, comprising:
    displaying a first window object, a second window object, a third window object, and a fourth window object in a virtual three-dimensional space as captured by a virtual camera on a two-dimensional display, wherein the first window object, the second window object, the third window object, and the fourth window object are displayed so that they are aligned along a common horizontal line of the two-dimensional display, wherein the second window object is opposed to the virtual camera and rendered at the center of the two-dimensional display as a focused window; and
    moving, in response to a user input for transition of the focused window, the virtual camera along a horizontal line substantially parallel to the common horizontal line in the virtual three-dimensional space so that the third window object, which is located next to the second window object, is opposed to the virtual camera and rendered at the center of the two-dimensional display as the focused window,
    wherein the fourth window object is in said first two-dimensional plane in said three-dimensional space along said common horizontal line, and is not located within a viewing angle of the virtual camera until the third window object is focused upon, and
    wherein said moving moves the virtual camera to a first predefined set position located directly in front of the third window object and said second window object is located on a left side of the third window object and said fourth window object is located on a right side of said third window object and after said moving of said virtual camera to the first predefined set position, said second window object and said fourth window object are only partially shown.

2. The information display method of claim 1, comprising:
    inclining a controller to provide the user input, the controller having an x-axis and a y axis,
    wherein inclination of the controller by an angle with respect to the y-axis is an instruction to trigger switching of a plurality of window objects as the focused window, and
    wherein inclination of the controller by an angle with respect to the x-axis is an instruction to trigger disposing a second catalog display.

3. The information display method of claim 2, wherein the angle with respect to the y-axis exceeds a predetermined first angular threshold, and wherein the angle with respect to the x-axis exceeds a predetermined second angular threshold.

4. The information display method according to claim 1, wherein a fifth window is displayed in said first two-dimensional plane in said three-dimensional space along said common horizontal line.

5. The information display method according to claim 1, wherein a fifth window object is located on a second horizontal line, different from said common horizontal line, and
    wherein said fifth window object is not in the viewing angle of the virtual camera.

6. The information display method according to claim 5, wherein a sixth window object is located on a right or left side of said fifth window object.

7. The information method of claim 1, wherein all of said window objects that are displayed by the virtual camera are always located on a same common horizontal line.

8. The information display method according to claim 1, wherein said virtual camera is moved to a second predefined set position located directly in front of the fourth window object and said third window object is located on a left side of the fourth window object and a fifth window object is located on a right side of said fourth window object and after moving said virtual camera to the second predefined set position, said third window object and said fifth window object are only partially shown.

9. The information method of claim 1, wherein all of said window objects in any given frame that are displayed by the virtual camera are always located on a same common horizontal line.

10. An information display apparatus, comprising:
    a display control unit for displaying a first window object, a second window object, third window object, and a fourth window object in a virtual three-dimensional space as captured by a virtual camera on a two-dimensional display, wherein the first window object, the second window object, the third window object are displayed so that they are aligned along a common horizontal line of the two-dimensional display, wherein the second window object is opposed to the virtual camera and rendered at the center of the two-dimensional display as a focused window; and an input device for moving, in response to a user input for transition of the focused window, the virtual camera along a horizontal line substantially parallel to the common horizontal line in the virtual three-dimensional space so that the third window object, which is located next to the second window object, is opposed to the virtual camera and rendered at the center of the two-dimensional display as the focused window, wherein the fourth window object is in said first two-dimensional plane in said three-dimensional space along said common horizontal line, and is not located within a viewing angle of the virtual camera until the third window object is focused upon, and wherein said moving moves the virtual camera to a predefined set position located directly in front of the third window object and said second window is object located on a left side of the third window object and said fourth window object is located on a right side of said third window object and after said moving of said virtual camera to the first predefined set position, said second window object and said fourth window object are only partially shown.

11. The information display apparatus of claim 10, comprising:
a controller for providing the user input, the controller having an x-axis and a y axis,
wherein inclination of the controller by an angle with respect to the y-axis is an instruction to trigger switching of a plurality of window objects as the focused window, and
wherein inclination of the controller by an angle with respect to the x-axis is an instruction to trigger disposing a second catalog display.

12. The information display apparatus of claim 11, wherein the angle with respect to the y-axis exceeds a predetermined first angular threshold, and wherein the angle with respect to the x-axis exceeds a predetermined second angular threshold.

13. A non-transitory computer-readable storage medium having stored thereon a program for causing a computer to execute an information display method, the method comprising:
displaying a first window object, a second window object, a third window object, and a fourth window object in a virtual three-dimensional space as captured by a virtual camera on a two-dimensional display, wherein the first window object, the second window object, the third window object, and the fourth window object are displayed so that they are aligned along a common horizontal line of the two-dimensional display, wherein the second window object is opposed to the virtual camera and rendered at the center of the two-dimensional display as a focused window; and moving, in response to a user input for transition of the focused window, the virtual camera along a horizontal line substantially parallel to the common horizontal line in the virtual three-dimensional space so that the third window object, which is located next to the second window object, is opposed to the virtual camera and rendered at the center of the two-dimensional display as the focused window, wherein the fourth window object is in said first two-dimensional plane in said three-dimensional space along said common horizontal line, and is not located within a viewing angle of the virtual camera until the third window object is focused upon, and wherein said moving moves the virtual camera to a first predefined set position located directly in front of the third window object and said second window is object located on a left side of the third window object and said fourth window object is located on a right side of said third window object and after said moving of said virtual camera to the first predefined set position, said second window object and said fourth window object are only partially shown.

14. The computer-readable storage medium of claim 13, comprising:
inclining a controller to provide the user input, the controller having an x-axis and a y axis,
wherein inclination of the controller by an angle with respect to the y-axis is an instruction to trigger switching of a plurality of window objects as the focused window, and
wherein inclination of the controller by an angle with respect to the x-axis is an instruction to trigger disposing a second catalog display.

15. The computer-readable storage medium of claim 14, wherein the angle with respect to the y-axis exceeds a predetermined first angular threshold, and wherein the angle with respect to the x-axis exceeds a predetermined second angular threshold.

* * * * *